(No Model.)
R. McCULLY.
CRUSHER.
No. 566,464. Patented Aug. 25, 1896.
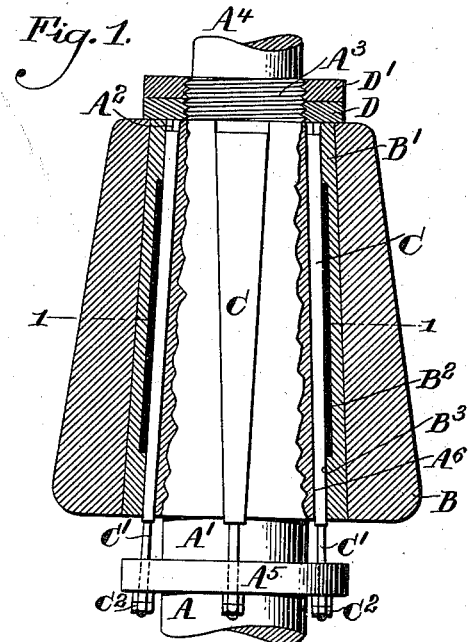
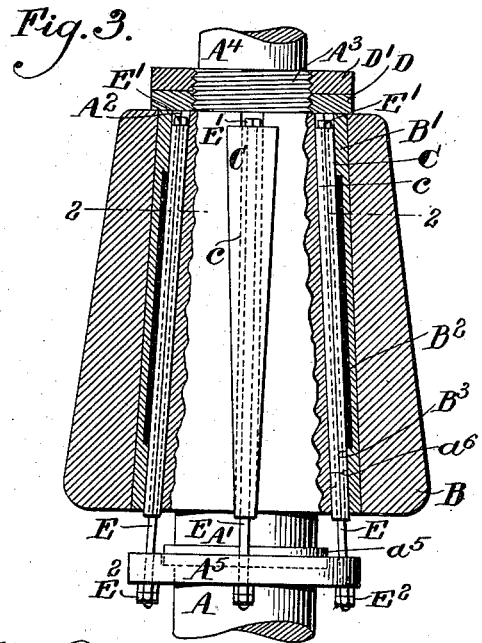
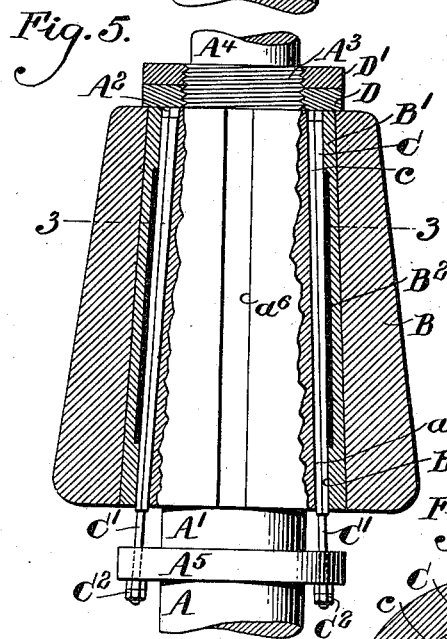
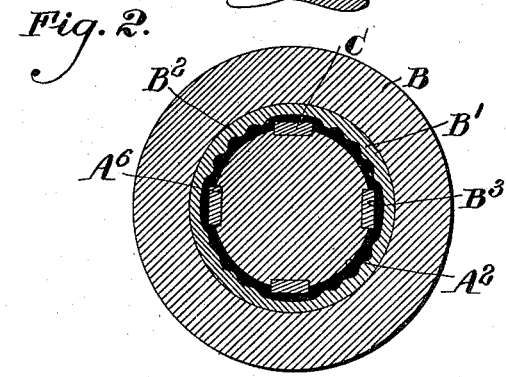
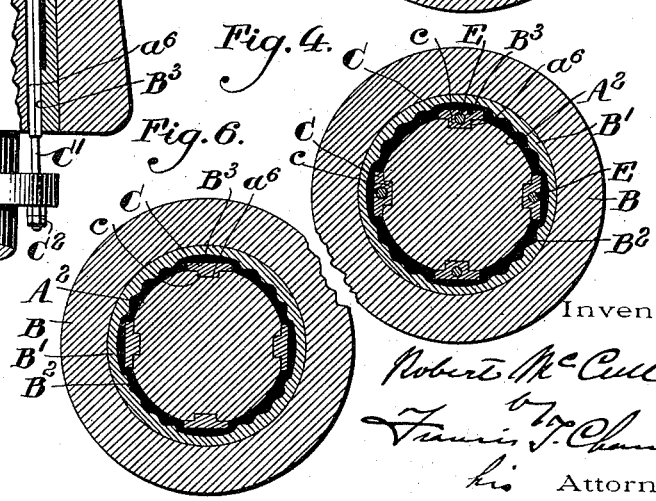
Witnesses.
Inventor.
Robert McCully
by
his Attorney.

UNITED STATES PATENT OFFICE.

ROBERT McCULLY, OF PHILADELPHIA, PENNSYLVANIA.

CRUSHER.

SPECIFICATION forming part of Letters Patent No. 566,464, dated August 25, 1896.

Application filed March 14, 1896. Serial No. 583,171. (No model.)

*To all whom it may concern:*

Be it known that I, ROBERT McCULLY, a citizen of the United States of America, residing in the city and county of Philadelphia, in the State of Pennsylvania, have invented a certain new and useful Improvement in Crushers, of which the following is a true and exact description, reference being had to the accompanying drawings, which form a part of this specification.

My invention relates to crushers of the type known as "gyratory" crushers, such, for instance, as is illustrated in my Patent No. 501,843, dated July 18, 1893, and particularly my invention relates to the construction of the gyratory shaft, the crushing-head secured thereto, and the devices by which the head and shaft are secured together and relatively adjusted, the object of my invention being to provide improved means for coupling and adjusting the head upon the shaft.

The nature of my improvements will be best understood as described in connection with the drawings, in which they are illustrated, and in which—

Figure 1 is an elevation, partly in section, of the portion of the shaft to which the head is secured and of the head secured thereon. Fig. 2 is a cross-section on the line 1 1 of Fig. 1. Fig. 3 is an elevation similar to Fig. 1, indicating a modification of my invention, Fig. 4 indicating a cross-section on the line 2 2 of Fig. 3. Fig. 5 is an elevation illustrating a third modification, and Fig. 6 a cross-section on the line 3 3 of Fig. 5.

A in each case indicates the lower portion of the shaft; $A^4$, the upper portion thereof, $A^2$ indicating a conical bearing-surface formed from the metal of the shaft, and upon which the head is supported. Below the conical bearing $A^2$, I form an annular recess $A'$, which must be of such diameter as will permit the keyways indicated at $A^6$ to merge into it. I refer to this as a recess, although obviously it need not be of less diameter than the portion A of the shaft, since the lower part of the conical bearing-surface is of greater diameter.

$A^3$ indicates a threaded portion of the shaft lying above the conical bearing-surface, and $A^5$ a flange or ring extending around the shaft below the recess $A'$ and affording a bearing for the ends of bolts. This flange or ring may be forged solid with the shaft, as indicated in Figs. 1 and 5, or it may be an annular loose ring, as indicated in Fig. 3, which is held in place against the under side of a light annular flange $a^5$, forged on the shaft.

As indicated in Fig. 1, the keyways $A^6$, formed in the face of the conical bearing $A^2$, are of downwardly-tapered form, corresponding with the keyways $B^3$, formed on the inside of the crusher-head. This, however, is not essential. Indeed, I prefer to form the keyways on the bearing-surface with less taper than the keyways on the inside of the head, and in Figs. 3, 4, 5, and 6 I have indicated the keyways here indicated by $a^6$ as having parallel sides.

B indicates the crushing-head proper; $B'$, an inner lining formed, as is usual, of metal somewhat softer than the chilled outer surface B of the head.

$B^2$ is an annular cavity, preferably having fluted sides, as shown, which, as is usual, I form on the inside of the lining of the head, and which is filled with a soft-metal filling after the head is seated on its bearing, the metal being poured in through a gate at the top or bottom of the head.

$B^3$ $B^3$, &c., indicate keyways formed on the inner surface of the head in such wise as to register with the keyways $A^6$ or $a^6$ of the conical bearing-surface. The portion of these keyways found in the soft-metal filling of cavity $B^2$ is formed in the casting of the soft metal, the keys being inserted before the metal is poured into the cavity.

C or c are tapered keys formed to fit in the registering grooves $B^3$ and $A^6$ or $B^3$ and $a^6$. In the case illustrated in Figs. 1 and 2 the keys have a uniform taper front and back, but in the other figures the "back," so to speak, of the keys indicated at c is conformed to the grooves $a^6$, which are straight-sided or at any rate of less taper than the grooves $B^3$ in the head. The lower ends of the keys indicated at C extend across the annular space $A'$ and are engaged by nuts $C^2$ on the under side of ring $A^5$, so that the keys, and through them the head B, can be drawn down on the bearing $A^2$, and so, also, that the keys can be drawn down with reference to the head or the bearing in case they become loose in the grooves by reason of wear.

I will note here that, while I prefer to utilize the ring $A^5$ as a means of drawing down the keys, I do not wish to be understood as limiting my invention to the use of any particular device for performing this function, save when the claims of my patent are expressly so limited.

I have found it advantageous in some cases to use, instead of steel keys C, keys formed of a relatively soft metal, because in case of unequal wear in the registering grooves a soft-metal key will conform itself under pressure to the form of the worn groove and thus insure a close fit and more effectually secure the head upon the bearing. It is, in case of the use of such soft-metal keys, advantageous to cast in the center of the key an iron bolt, as indicated at E, Figs. 3 and 4, the head E' of the bolt resting on the top of the keys, as shown, and its lower end passing through the ring $A^5$ and being engaged by nuts $E^2$, as shown in Fig. 3.

D D' indicate nuts screwing on the portion $A^3$ of the shaft, and, as shown, acting to press and hold the head B down upon the conical bearing $A^2$.

The mode of adjusting and operating my improved device has been sufficiently described above in connection with the drawings, and I will only add that the provision of the annular groove A' and of the removable ring $A^5$, operating in connection with the forged flange $a^5$, while new with me, are claimed in another application, filed March 4, 1896, Serial No. 581,755, for an improvement in crushing-machines, and therefore are not claimed in this application, save in particular and novel combinations.

Having now described my invention, what I claim as new, and desire to secure by Letters Patent, is—

1. A shaft for a crushing-machine having a conical bearing as $A^2$ for a crusher-head and keyways in the bearing in combination with a crusher-head seated on the conical bearing and having downwardly-tapered keyways formed to register with the keyways in said bearing, keys conformed in shape to the keyways in the head and conical bearing and means whereby said keys are forced downwardly to tighten their hold on the keyways.

2. A shaft for a crushing-machine having a conical bearing as $A^2$ for a crusher-head, and keyways in the bearing in combination with a crusher-head seated on the conical bearing and having downwardly-tapered keyways formed to register with the keyways in said bearing, soft-metal keys conformed in shape to the keyways in the head and conical bearing and means whereby said keys are forced downwardly to tighten their hold on the keyways.

3. A shaft for a crushing-machine having a conical bearing as $A^2$ for a crusher-head, an annular recess as A' situated below and of smaller diameter than the base of the bearing, keyways in the bearing and a collar as $A^5$ secured to the shaft below the recess A' in combination with a crusher-head seated on the conical bearing and having downwardly-tapered keyways formed to register with the keyways in said bearing, keys conformed in shape to the keyways in the head and conical bearing and having bolt extensions spanning recess A' and engaged with collar $A^5$ whereby said keys can be drawn down at will.

4. A shaft for a crushing-machine having a conical bearing as $A^2$ for a crusher-head and keyways in the bearing in combination with a crusher-head seated on the conical bearing and having downwardly-tapered keyways formed to register with the keyways in said bearing, keys of soft metal conformed in shape to the keyways in the head and conical bearing, bolts running through said keys longitudinally and extending below the same across the recess A' and a collar as $A^5$ secured to the shaft below the recess A' and by which the bolts and keys can be drawn down.

R. McCULLY.

Witnesses:
J. E. CARPENTER,
D. STEWART.